UNITED STATES PATENT OFFICE.

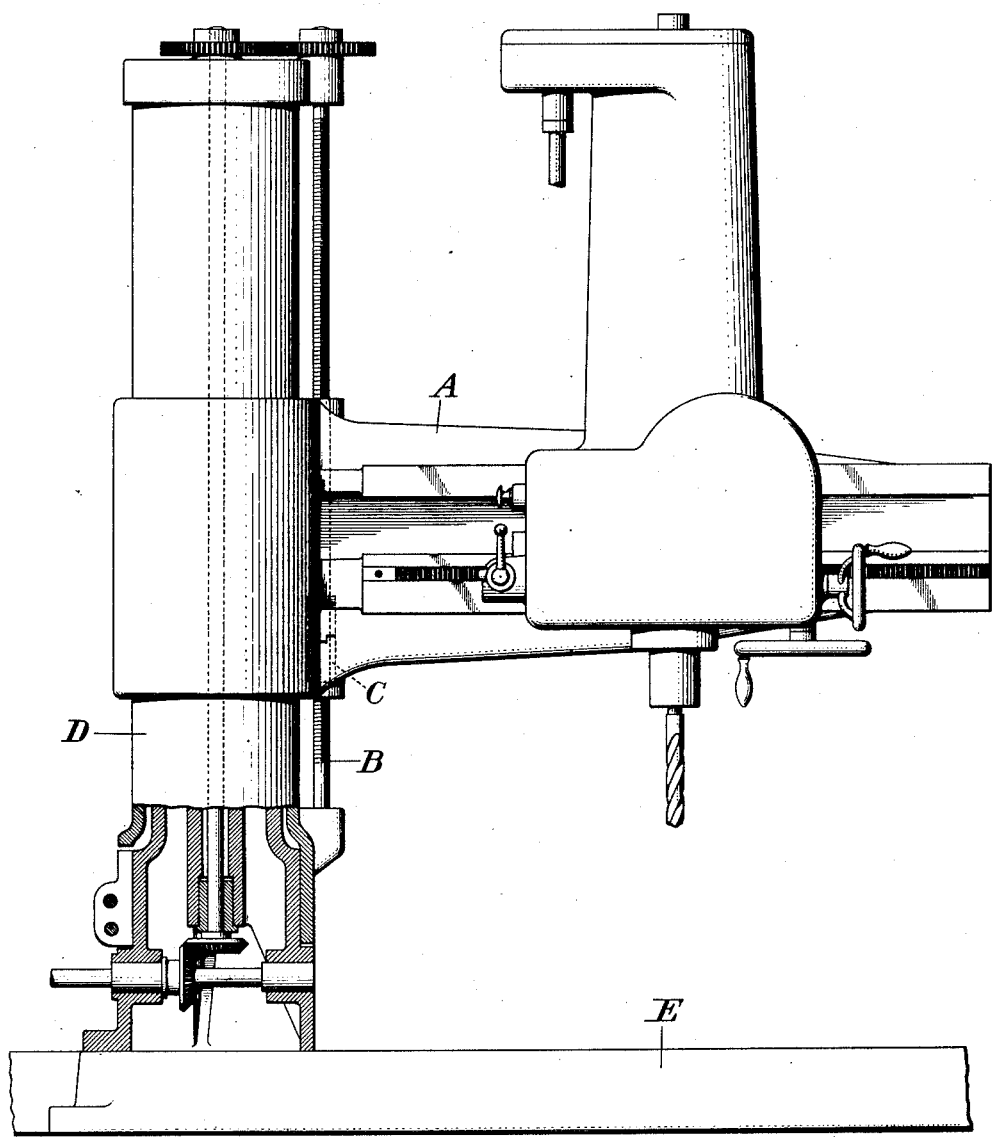

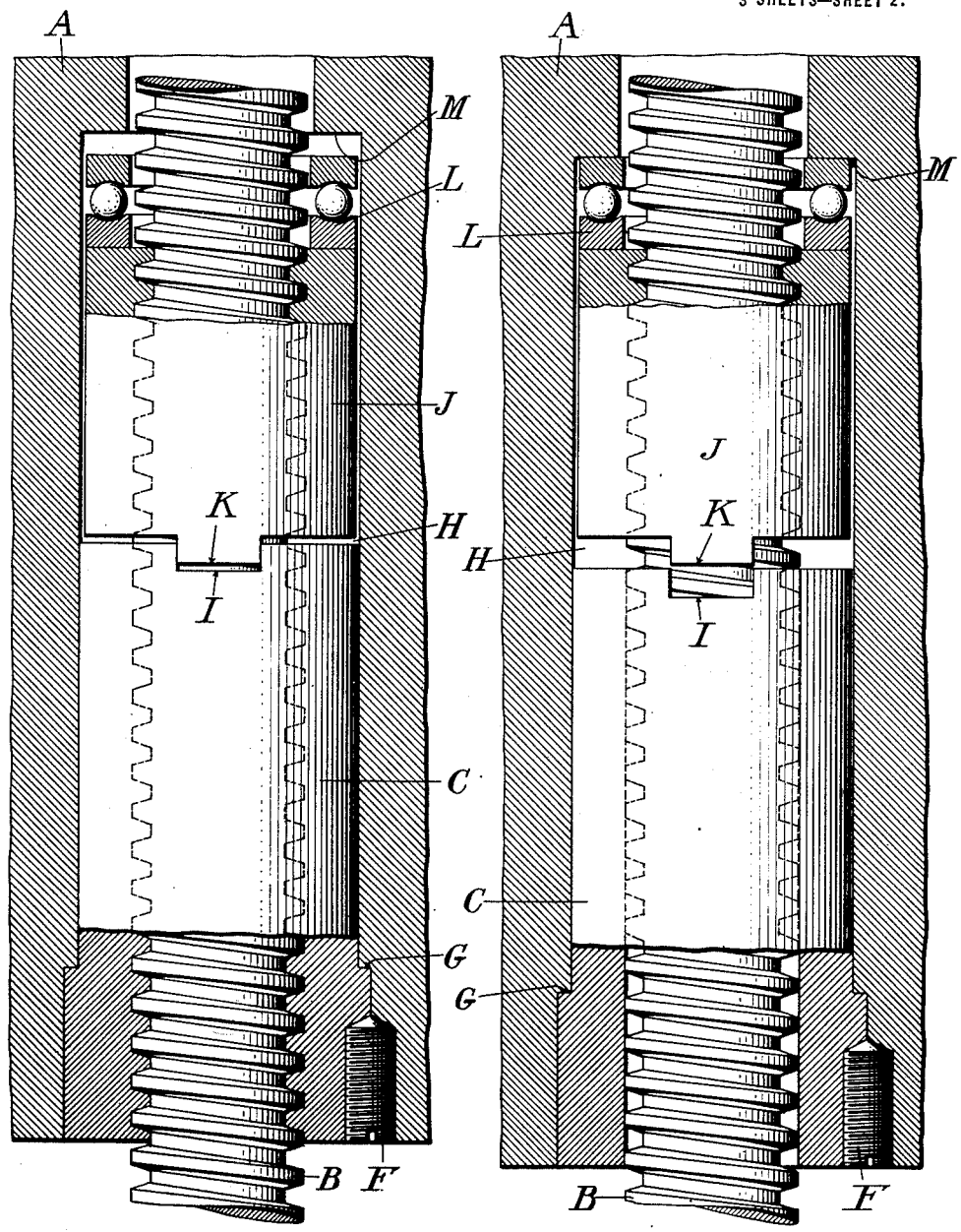

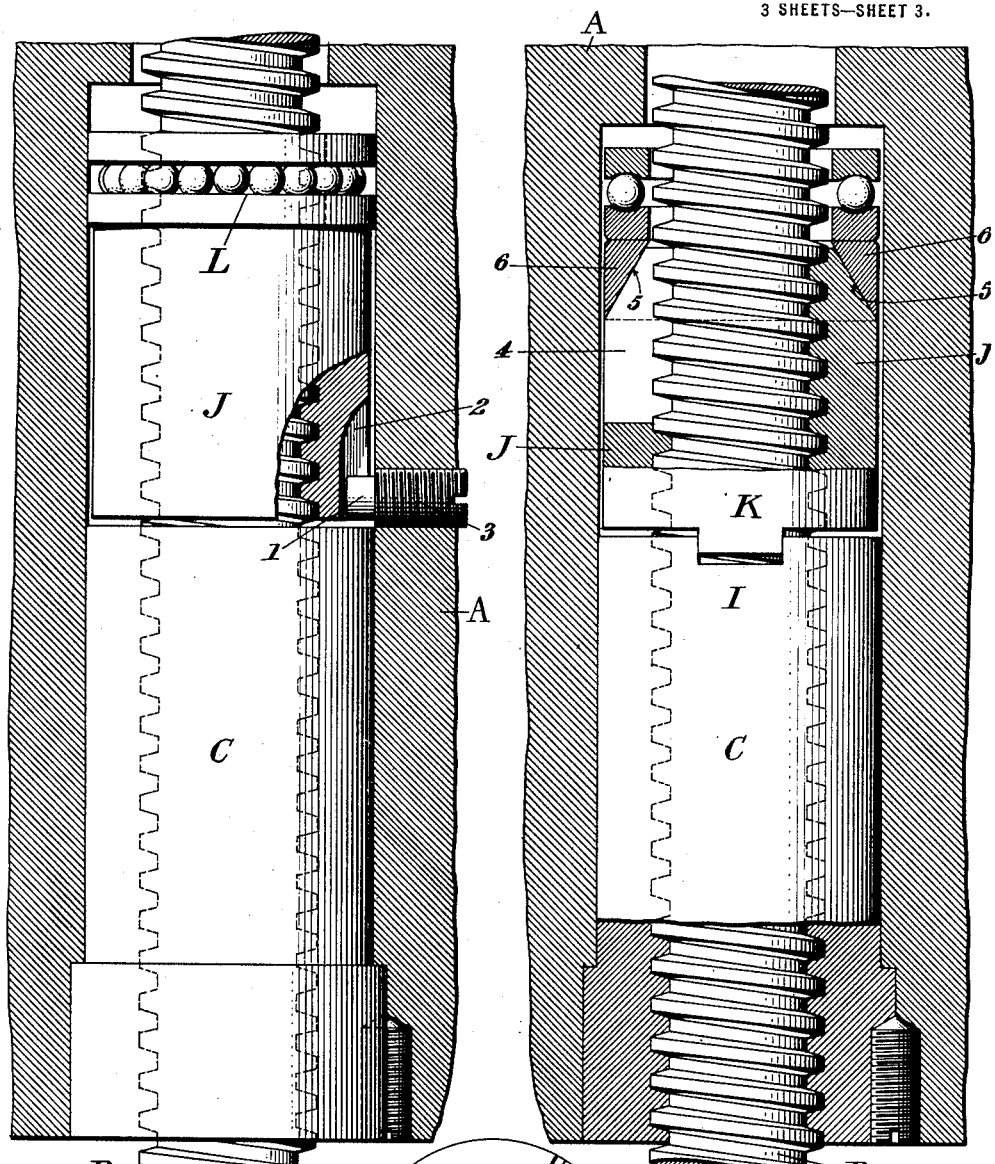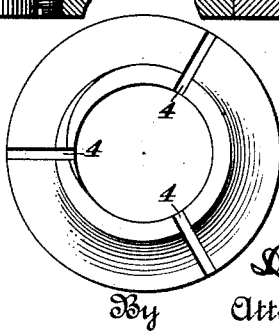

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

DECLUTCHABLE SAFETY COLLAR.

1,408,891. Specification of Letters Patent. Patented Mar. 7, 1922.

Application filed November 10, 1920. Serial No. 423,096.

*To all whom it may concern:*

Be it known that I, DAVID C. KLAUSMEYER, a citizen of the United States, and residing at Cincinnati, in the county of Hamilton and State of Ohio, have invented a new and Improved Declutchable Safety Collar, of which the following specification is a full disclosure.

This invention deals with safety devices for the elevating mechanisms of machine tools. In certain types of machine tool, notably in radial drills, a heavy frame-element must be movable vertically for the purpose of obtaining an effective working relation between the tool and the blank or work. This element, in the case of radial drills, assumes the form of an arm that overhangs the bed or table. The raising and lowering of the arm is commonly effected by means of a screw and a nut, the one being ordinarily held stationary while the other is rotated either by power or by hand as the case may be. Inasmuch as the frame-element lifted by the co-action between the nut and the screw is ordinarily of a very heavy and ponderous nature, and since the threads of the nut are subject to wear, especially if the lubrication thereof be neglected, or may be stripped in consequence of an improper handling of the machine, it will be apparent that the weight of the arm may become unsupported and capable of abruptly sliding down its guideways, resulting either in a damage to the machine or in an accident or injury to the attendant.

Various expedients have heretofore been proposed in an effort to safeguard the arm or other heavy element from thus falling. In one of such arrangements, a substitute nut has been so mounted on the screw that, when the main nut failed, it would forthwith come into action and continue to perform the office of a main nut. Such an arrangement, however, does not satisfactorily meet the difficulty because it does not possess the wearing qualities that the original nut had and it is very likely to fail after a very short period of use and permit the very accident which it was intended to prevent. In such arrangements as have heretofore been proposed, the operator would be given no sufficient warning of the failure of the main nut and consequently he would be very likely to continue using the machine without being aware of the fact that the lifting was being performed by the temporary nut. In the event of the failure of the main nut, the threads of the screw would be more or less filled with fragments of the stripped threads and these steel fragments would soon cut away the threads of the temporary nut, and the latter would be rendered ineffective to support the weight of the frame-element and an accident would be likely shortly to follow.

The primary object of this invention is to render available a safety device which, as soon as the true lifting nut becomes inoperative, will continue to maintain the mechanism in that inoperative condition without, however, permitting any fall of the arm or other major element of the machine. In other words, this invention puts the attendant upon notice the instant the main nut ceases to function and makes it impossible for the attendant to postpone the repair of the machine or to continue its use until the stripped nut has been replaced by a new one.

Other objects and advantages will be in part indicated in the following description and in part rendered apparent therefrom in connection with the annexed drawings.

To enable others skilled in the art to so fully apprehend the underlying features hereof that they may embody the same in the various ways contemplated by this invention, drawings depicting a preferred typical construction have been annexed as a part of this disclosure, and in such drawings like characters of reference denote corresponding parts throughout all the views, of which:—

Fig. 1 is an elevation of a radial drill embodying this invention. Fig. 2 is an axial section showing a revolvable screw and a stationary nut secured to the liftable frame-element, and showing the de-clutchable safety collar in its idle or alert position. Fig. 3 is a view of the same elements, depicting the threads of the main nut as stripped and showing the safety collar in its safeguard or active position. Fig. 4 is a longitudinal section of a modification showing the safety collar clutched directly to a portion of the frame-element instead of to the main nut as shown by Figs. 2 and 3. Fig. 5 is a further modification showing the self-clamping safety collar which acts automatically to bind itself against relative movement with respect to the screw. Fig. 6 is a plan of the aforesaid self-clamping collar.

A vital structural distinction between this invention and its predecessors consists in the fact that the safety element does not function as a nut in this invention and, accordingly, is incapable of acting to elevate the arm either in its dormant or in its active condition. Mechanically speaking, it plays the role of a collar or shoulder occupying a fixed position on the screw whenever the main nut has failed and capable, at other times, of merely trailing the main nut so as always to be in position to function as a fixed collar whenever occasion requires.

Continuing now by way of a more detailed explanation of the specific embodiments herein referred to as exemplifications of the principles of this invention, A represents the frame-element of the machine tool which is raised and lowered by means of a suitable power driven screw B through the agency of a suitable main nut C threaded on said screw. The element A is here illustrated as the arm of a radial drill which is vertically guided by a post D upstanding from an appropriate base E. These details are entirely conventional and therefore need not be enlarged upon. Turning to Fig. 2, the nut proper C is suitably secured, as by means of the screw F, against turning in the arm A. This nut is provided with a shoulder G or is otherwise secured against moving upwardly in the recess H and the upper end of said nut terminates short of the end of said recess and is provided with a clutch member I at its extremity. In the space between the upper end of the nut proper C and the upper end of the socket, is located a safety collar J. This collar is internally screw threaded to receive the threads of the screw B and at its lower end is provided with a clutch member K which normally interfits with the clutch member I provided by the nut proper. The upper end of the collar J is constructed, as by means of an interposed ball bearing L, so that when its shift is limited by means of a shoulder M, it will not be unduly retarded against rotating as a unit with the screw B.

The operation of this device may be best understood by comparing Figs. 2 and 3. The former represents the normal state of affairs and it will be seen that, by virtue of an engagement between the clutch surfaces I and K, the safety collar J will be restrained against any rotation relative to the nut and, on the other hand, the screw freely turns within the safety collar J so that the latter is, in fact, a purely idle element. Now, should the threads strip, the frame-element A will start to drop (carrying the nut C) and this drop will continue for a distance equal to about the thickness of a thread and will result in a separation of the clutch members K and I. This movement will bring the thrust bearing L against the shoulder M and the collar J will now be free to rotate as a unit with the screw B; the friction of the ball bearing being considerably less than the friction between the threads of the screw and of the collar.

It will be observed that, in the form shown by Figs. 2 and 3, the nut is non-rotatably mounted in the frame-element A, and the screw B is rotated, although the converse may be resorted to. When the nut is non-rotatably secured to the frame-element, the collar may be arranged in detachable relation with a part of the frame-element, as for example, as shown by Fig. 4. In this instance the means for normally preventing the safety collar from rotating relative to the nut comprises a detent 1 which engages a slot 2 in the collar open at its lower end so that any appreciable movement of the collar within its pocket will bring it out of engagement with the detent 1 and permit the collar to rotate with the screw. This detent 1 is shown as the tip of a set-screw 3 which is mounted in the frame-element A.

As has been explained, the purpose in using a ball thrust bearing L is to insure that the friction between the threads of the collar and the screw will be greater than the friction between the collar and the frame-element. The reason for this apportionment is to insure that the collar shall not rotate relative to the screw instead of depending upon a ball-bearing, or in lieu thereof, self-clamping construction may be resorted to. Thus, as shown by Figs. 5 and 6, the collar may be provided with splits 4 after the fashion of a collet-chuck, and the upper extremity of such collar may be tapered as indicated by 5. A wedge-ring 6 is arranged to circumscribe the tapered portion 5. Now, if the nut should fail, the collet-like collar will be brought forcibly against the wedge-ring 6 by the thrust of the frame-element, and the collar will be sprung against the threads of the screw so as tightly to grip the same and prevent any relative movement between the collar and the screw.

It will be perceived from the foregoing that this invention is well adapted to achieve the objects and ends thereof and that, structurally considered, it is very simple, serviceable and reliable.

Without further analysis the foregoing will so fully reveal the gist of this invention that others can, by applying current knowledge, readily adapt it for various utilizations without omitting certain features that, from the standpoint of the prior art, fairly constitute essential characteristics of the generic or specific aspects of this invention, and therefore such adaptations should be and are intended to be comprehended within the meaning and range of equivalency of the following claims.

Having thus revealed this invention, I claim as new and desire to secure the following combinations of steps and elements, or equivalents thereof, by Letters Patent of the United States:

1. A machine-tool combining a screw; a nut and a collar threaded thereon and coupled to turn as a unit on said screw; a frame-element receiving the thrust of said screw; a second frame-element receiving the thrust of said nut and providing sufficient clearance from the end-face of said collar to permit its detachment from said nut if its thread should strip; and means for effecting a relative rotation between said nut and screw to produce a relative movement between said frame-elements.

2. A machine-tool combining a first frame-element; a screw having a thrust-mounting therein; a second frame-element; a nut having a thrust-mounting therein and threaded on said screw; a collar threaded to idle on said screw; means detachably engaging said collar to normally restrain it from rotating relatively to said nut, said means being movable with said second frame-element, if the thread of said nut should strip, out of engagement with said collar to permit it to take the thrust of said second frame-element and be non-rotatable relatively to said screw; and means for effecting a relative rotation between said screw and nut to move said frame-elements apart.

3. A machine-tool combining a screw; a nut and a collar threaded thereon; a frame-element normally receiving the thrust of said nut; means normally effective to prevent any relative rotation between said nut and said collar, said means being constructed to become ineffective upon a predetermined variation in the distance between said nut and collar; and means for causing a relative rotation between said nut and said screw.

4. A safety-device embodying a screw; a nut and a collar threaded thereon; and a connection normally prohibiting relative rotation between said nut and collar, said connection being constructed to become inoperative if an abnormal relation between said nut and screw should occur.

5. A device of the nature disclosed combining a screw; a nut and a collar adjacent thereto on said screw, the contiguous ends of said nut and collar being arranged to interfit to inhibit relative rotation therebetween; and a member normally restrained against translation by said nut independently of said collar, and adapted to be moved against said collar and restrained thereby if said nut should fail.

6. A machine-tool combining a screw; a nut and a collar threaded thereon and coupled to turn as a unit on said screw; a ball-bearing; a frame-element receiving the thrust of said screw; a second frame-element receiving the thrust of said nut and providing sufficient clearance from the end-face of said ball-bearing to permit the detachment of said collar from said nut if its thread should strip; and means for effecting a relative rotation between said nut and screw to produce a relative movement between said frame-elements.

7. A machine-tool combining a first frame-element; a screw having a thrust-mounting therein; a second frame-element; a nut having a thrust-mounting therein and threaded on said screw; a collar threaded to idle on said screw; a ball-bearing; means detachably engaging said collar to normally restrain it from rotating relatively to said nut, said means being movable with said second frame-element, if the thread of said nut should strip, out of engagement with said collar to permit it, through said interposed ball-bearing, to take the thrust of said second frame-element and be non-rotatable relatively to said screw; and means for effecting a relative rotation between said screw and nut to move said frame-elements apart.

8. A machine-tool combining a screw; a nut and a collar threaded thereon; an anti-friction bearing; a frame-element normally receiving the thrust of said nut, means normally effective to prevent any relative rotation between said nut and said collar, said means being constructed to become ineffective upon a predetermined variation in the distance between said nut and collar; and means for causing a relative rotation between said nut and said screw.

9. A safety-device embodying a screw; a nut and a collet-like collar threaded thereon; a connection normally prohibiting relative rotation between said nut and collar, said connection being constructed to become inoperative if an abnormal relation between said nut and screw should occur; and means adapted to cause said collar to grip said screw.

10. A device of the nature disclosed combining a screw; a nut and a collar adjacent thereto on said screw, the contiguous ends of said nut and collar being arranged to interfit to inhibit relative rotation therebetween; a member normally restrained against translation by said nut independently of said collar, and adapted to be moved against said collar and restrained thereby if said nut becomes inoperative; and means for clamping said collar and screw together.

11. A safety-device combining two relatively movable members; a screw and a nut relatively rotatable and mounted respectively on said members to move them against a counter-force; and a collar threaded to said screw and normally restrained against rotation with respect to said nut, said collar being constructed and arranged to become rotatable relative to said nut when the later ceases effectively to engage said screw and thereby prohibit any untoward relative movement of said members.

12. A safety-device comprising a nut; a collar clutched thereto; a member non-translatably mounting said nut but so mounting said collar as to permit it to be shifted sufficiently to become independent of said nut; a screw threaded through both said nut and collar to normally hold them clutched together; two members adapted to be relatively moved by the relative rotation between said nut and screw so long as said nut remains effective but to be restrained by said collar against relative movement whenever said nut becomes ineffective.

13. A safety elevating-mechanism combining a stationary member and a member adapted to be raised relatively thereto; a nut mounted in one of said members and normally restrained against rotation relatively thereto; a screw rotatably secured to the other member and threaded through said nut; and means automatically operative under abnormal conditions to release said restraint and enable said nut to rotate as a unit with said screw whereby the raised member may be supported but not further elevated by said nut notwithstanding a continued rotation of said screw.

14. A safety elevating-mechanism combining an elevatable member and a stationary member; a screw rotatably secured to one of said members; a nut seated in the other member; means normally operative on said nut to prohibit its rotation, said means being automatically adapted under abnormal conditions to permit said nut to rotate as a unit with said screw; and a ball-bearing adapted to receive the thrust between said nut and the member in which it is mounted so as to promote the rotation of said nut when permitted by said means.

15. A safety elevating-mechanism combining a stationary member and an elevatable member; a nut seated in a socket in one of said members; an anti-friction thrust-bearing interposed between said nut and a shoulder of said socket; a tubular element also seated in said socket and normally engaging said nut to prevent rotation thereof, said nut and element being adapted automatically to become disengaged under abnormal conditions to permit said nut to rotate freely; and a lifting-screw rotatably connected to the other member and threaded through said nut.

16. An elevating-mechanism combining a member providing a seat; an anti-friction thrust-bearing adjacent said seat; a tubular element non-rotatably secured to said member and spaced from said thrust-bearing; a nut intervening between said thrust-bearing and said element and normally clutched to said element so as to be prevented thereby from rotating; a second member; and a screw rotatably bearing on said second member and extending successively through the bores of said element, said nut and said thrust-bearing and adapted to cooperate with said parts to effect a separation of said members, the construction being such that under abnormal conditions said element and said nut will automatically become declutched to permit said nut to rotate as a unit with said screw and thereby render the latter impotent to effect a further separation of said members.

17. A safety elevating-mechanism combining a member having a socket; an anti-friction thrust-bearing shouldered against one end of said socket, a first tubular part non-rotatably secured to said member; a second tubular part located in said socket and having its one end adjacent said thrust-bearing and having its other end engaging said first part so as to be held thereby against rotation, one of said parts being adapted under abnormal conditions automatically to shift axially sufficiently to disengage the other part and permit the second part to rotate; and a rotatably mounted lifting screw threaded through said second part to rotate; and a rotatably mounted lifting screw threaded through said second part and adapted to effect a rotation thereof against said anti-friction bearing when said second part is disconnected from said first part and thereby render said rotating lifting-screw impotent to feed through said second part.

18. A safety elevating-mechanism combining an elevatable member and a stationary member; a screw rotatably secured to one of said members; a nut seated in the other member; means carried by said other member independently of said screw and normally operative on said nut to prohibit its rotation, said means being adapted under abnormal conditions automatically to permit said nut to rotate as a unit with said screw; and a ball-bearing adapted to receive the thrust between said nut and the member in which it is mounted so as to promote the rotation of said nut when permitted by said means.

In witness whereof, I hereunto subscribe my name, as attested by the two subscribing witnesses.

DAVID C. KLAUSMEYER.

Witnesses:
C. C. SLETE,
ANNA M. HUSSIAN.